July 14, 1925.
M. E. WIDELL ET AL
1,545,624
CAN HEADING AND SEAMING MECHANISM
Filed Jan. 18, 1922 17 Sheets-Sheet 1
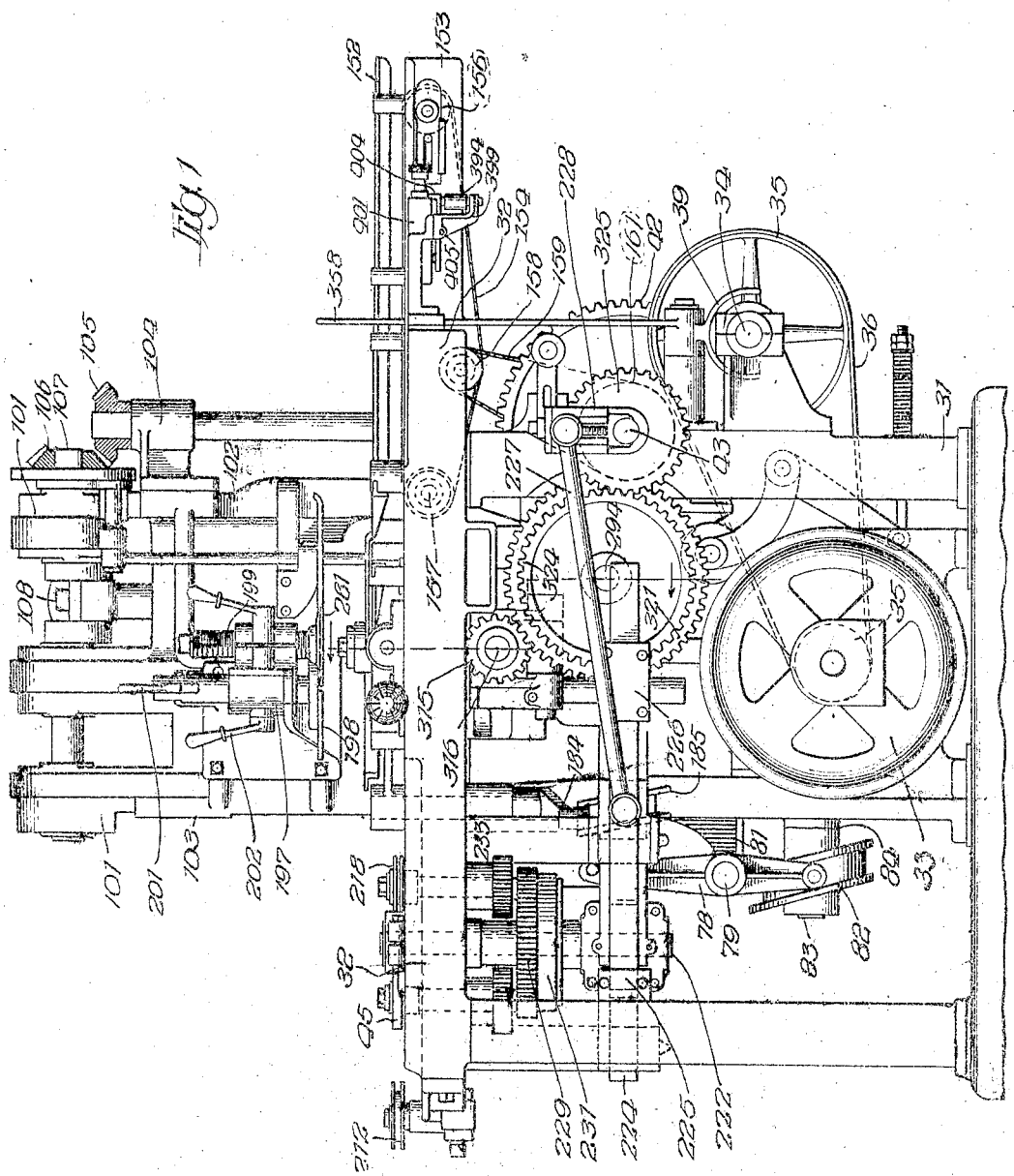

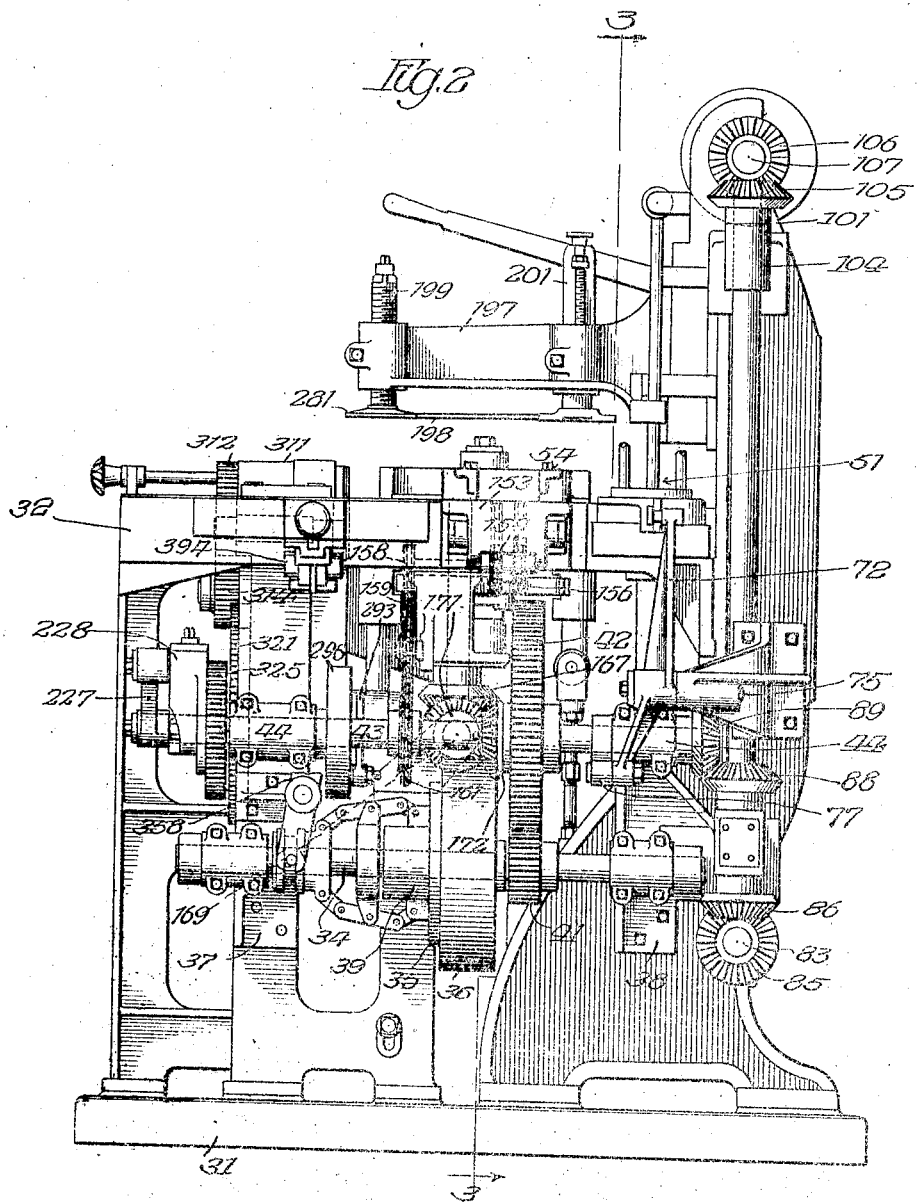

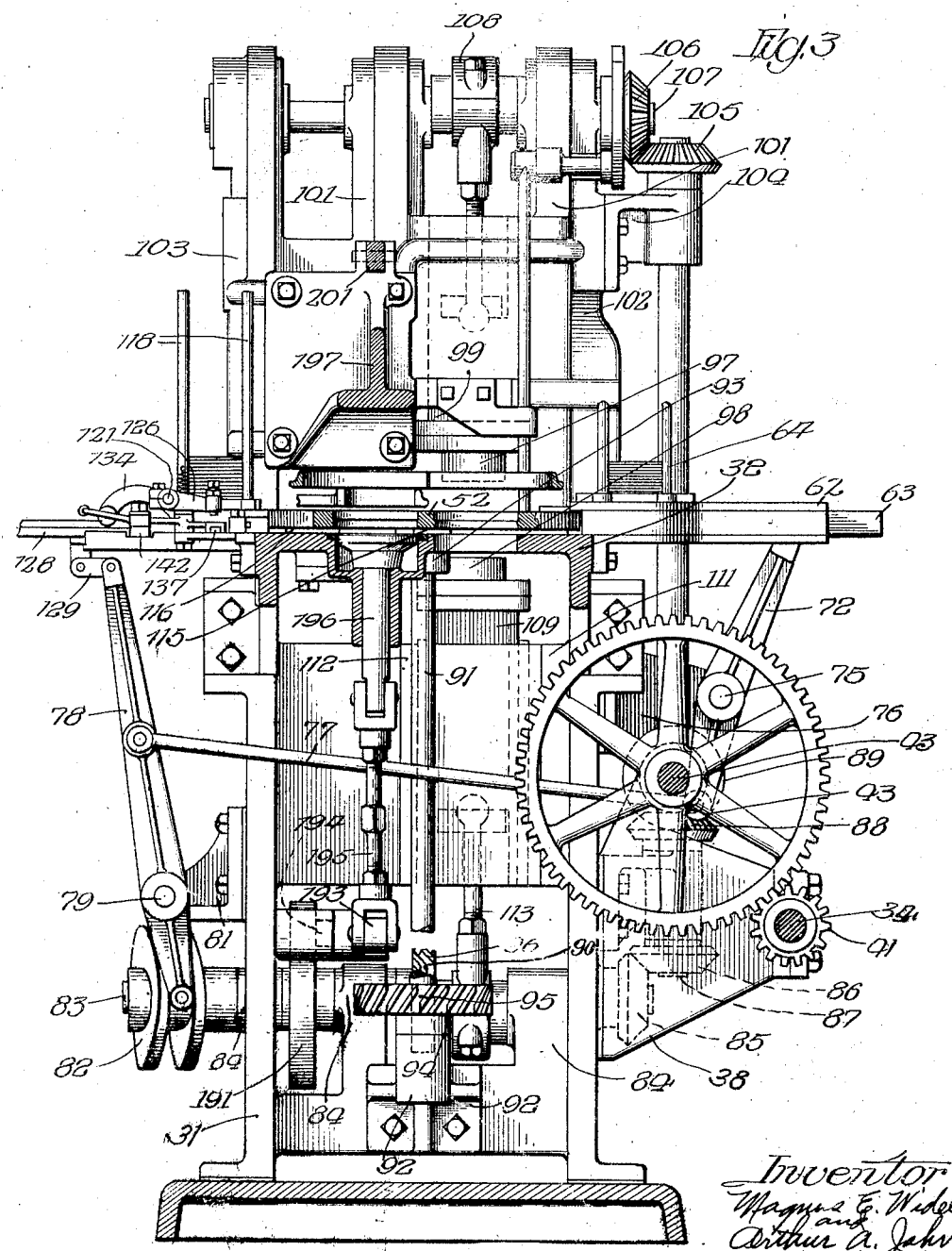

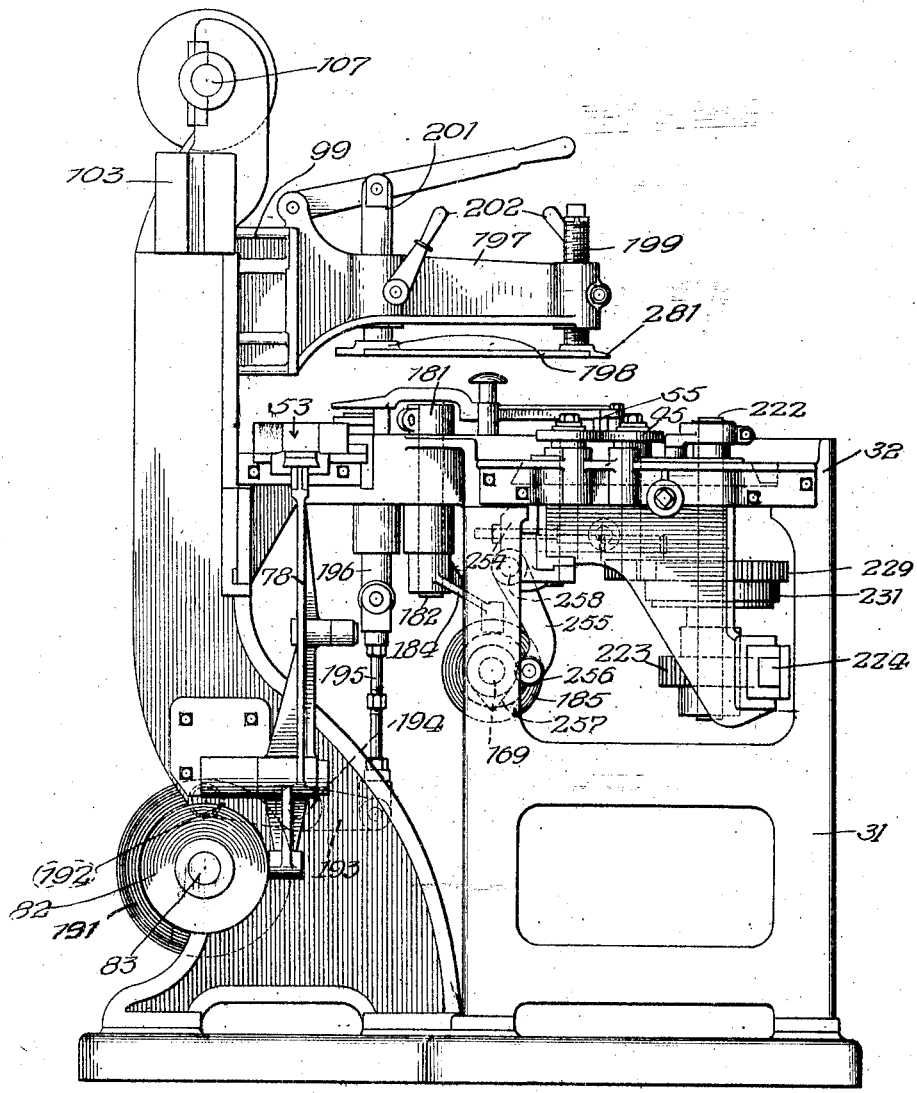

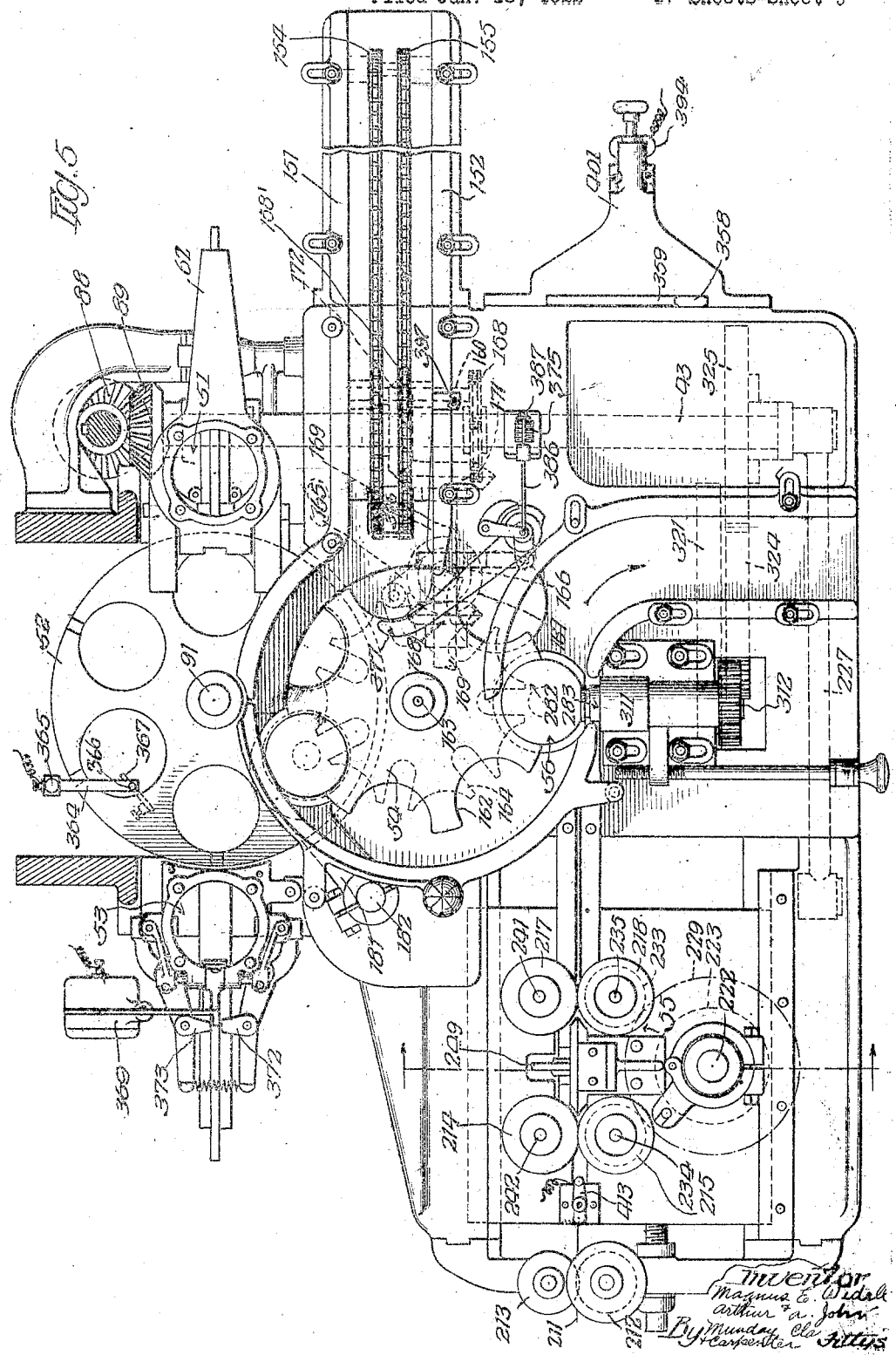

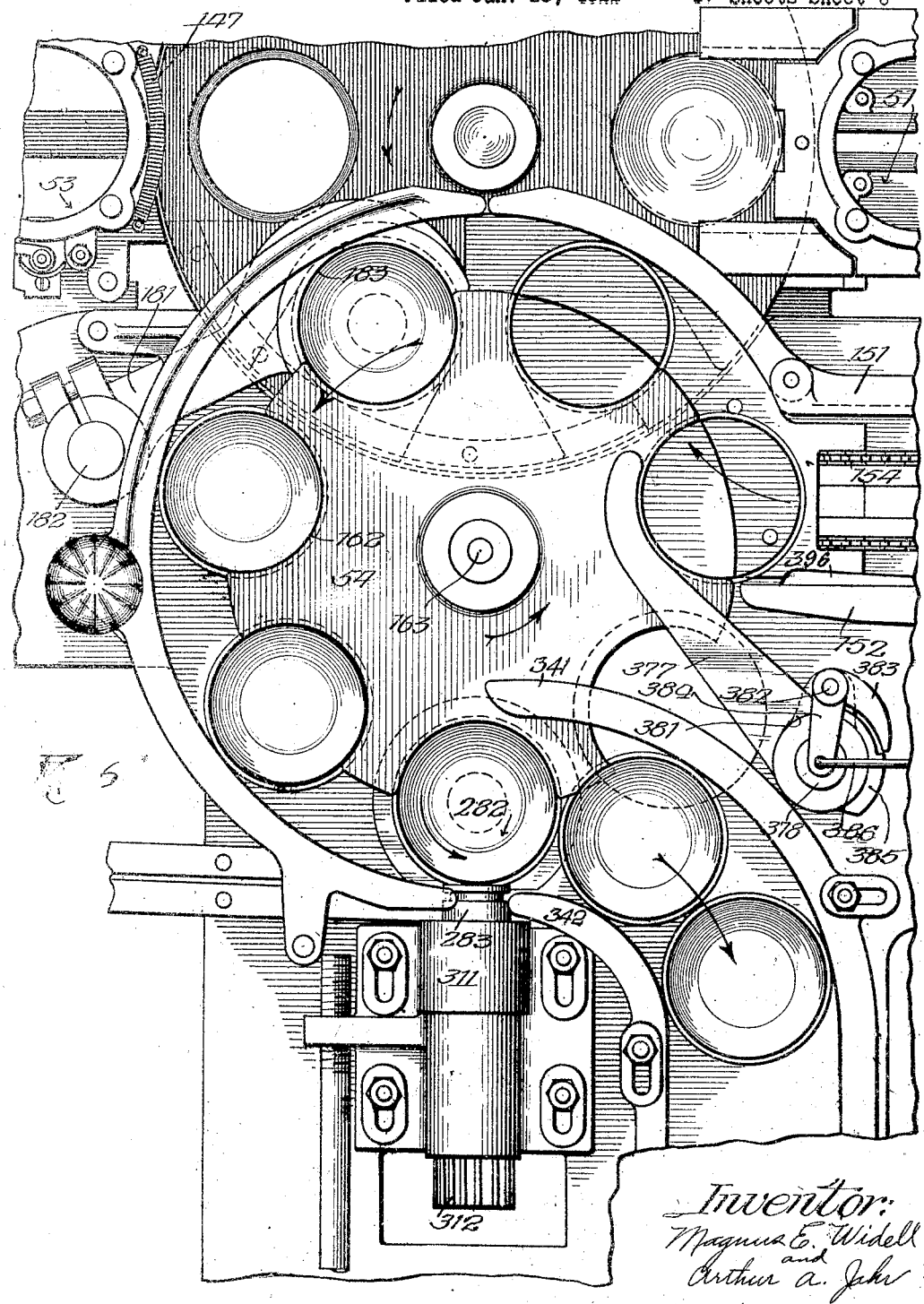

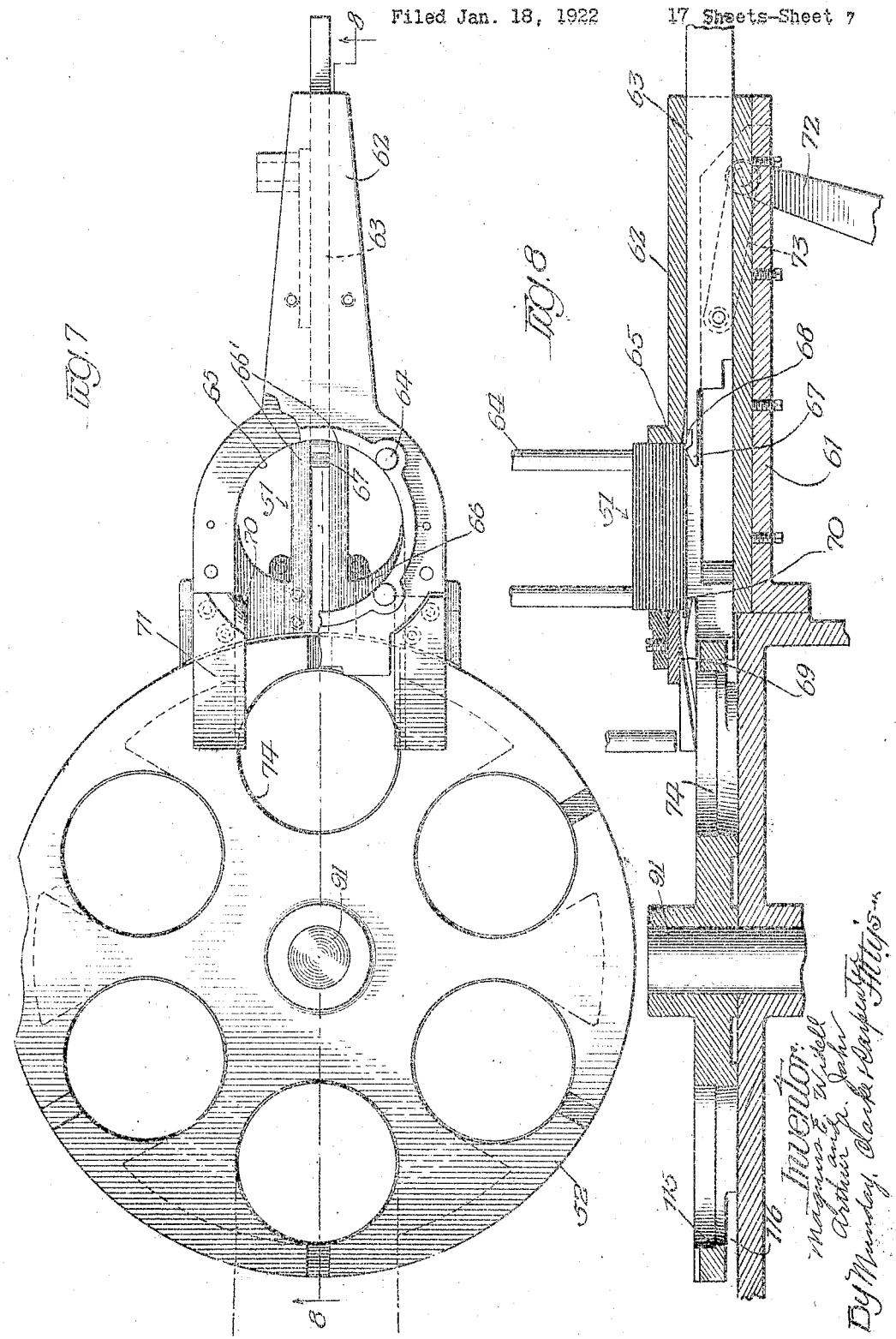

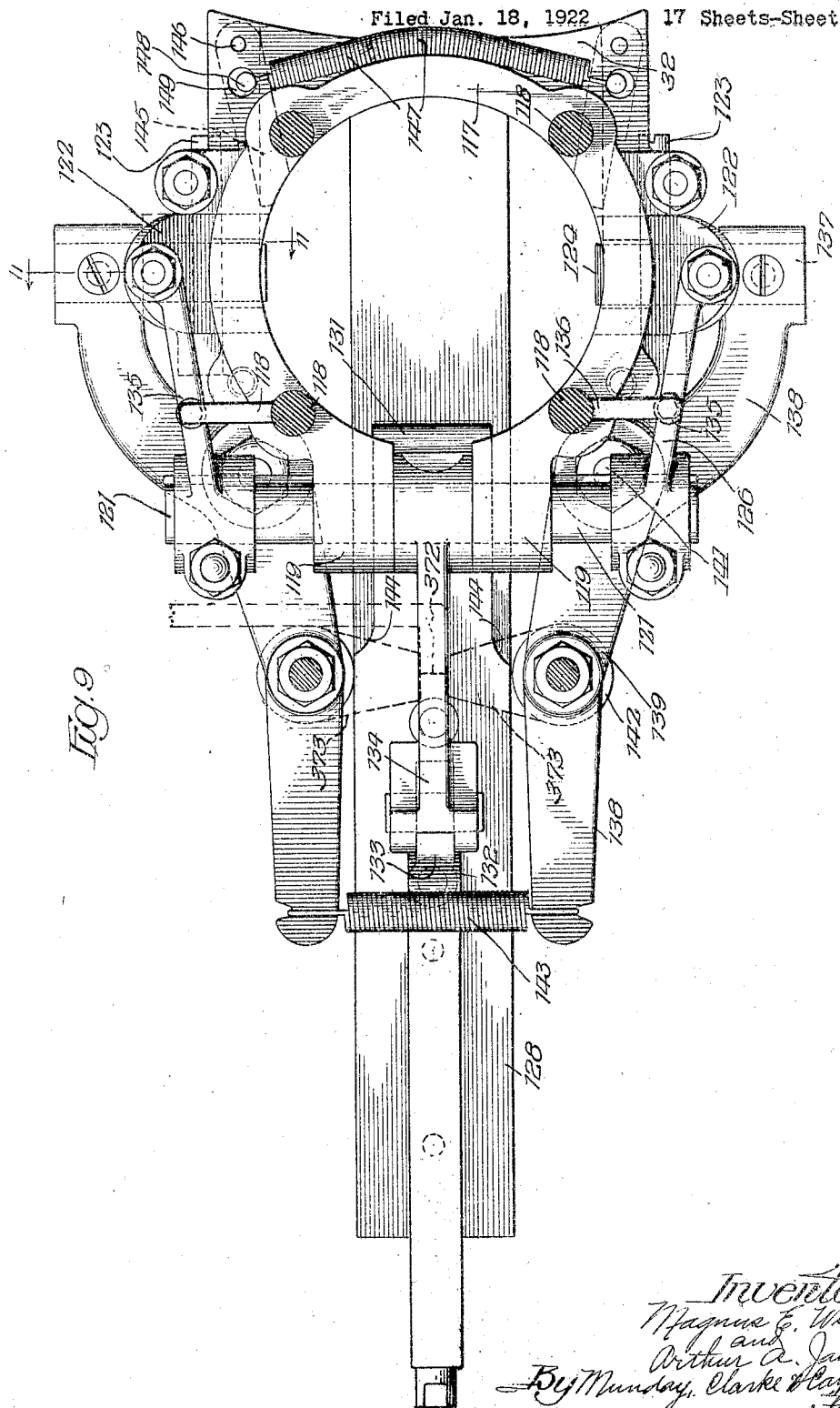

July 14, 1925.
M. E. WIDELL ET AL
1,545,624
CAN HEADING AND SEAMING MECHANISM
Filed Jan. 18, 1922      17 Sheets-Sheet 9
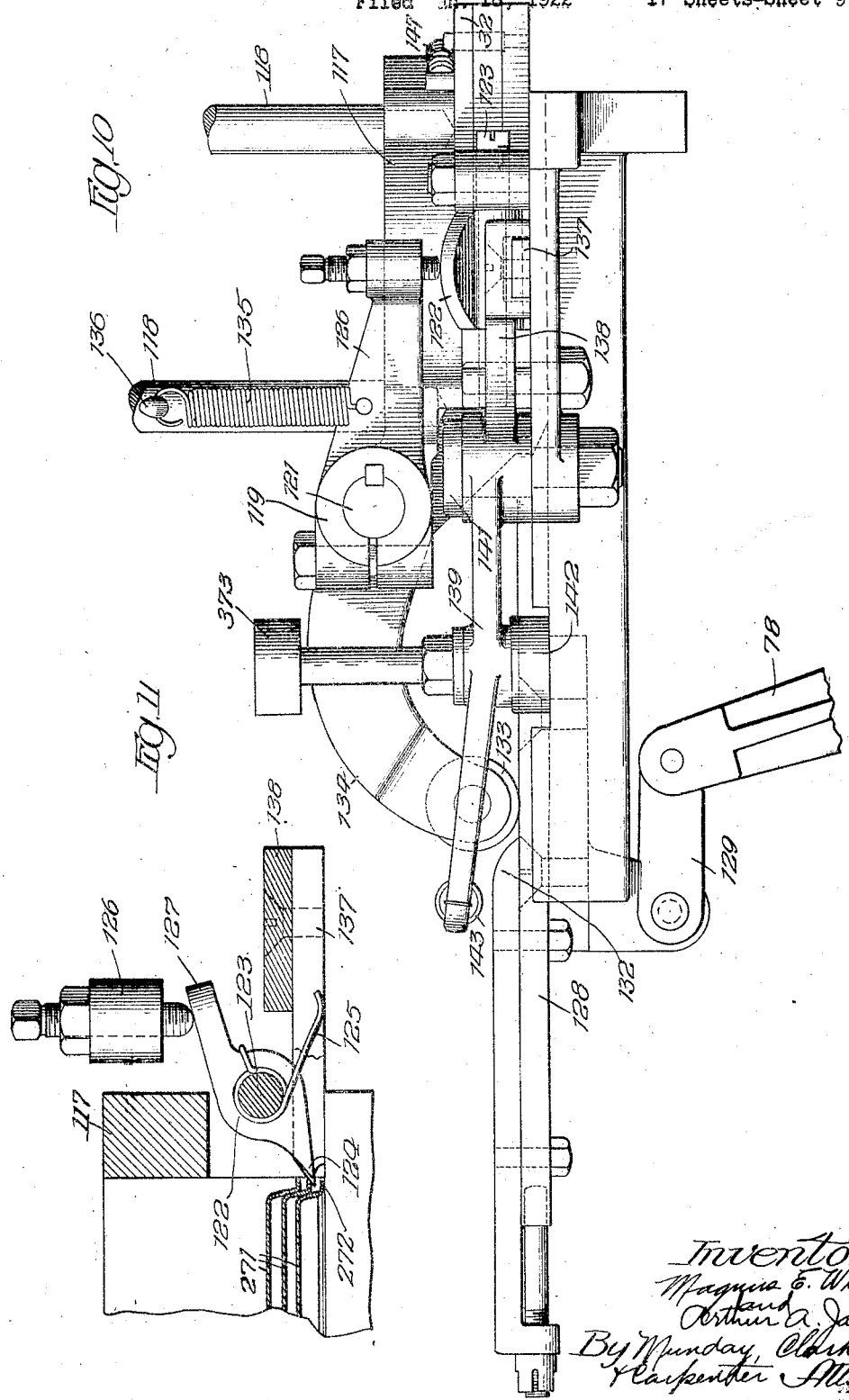

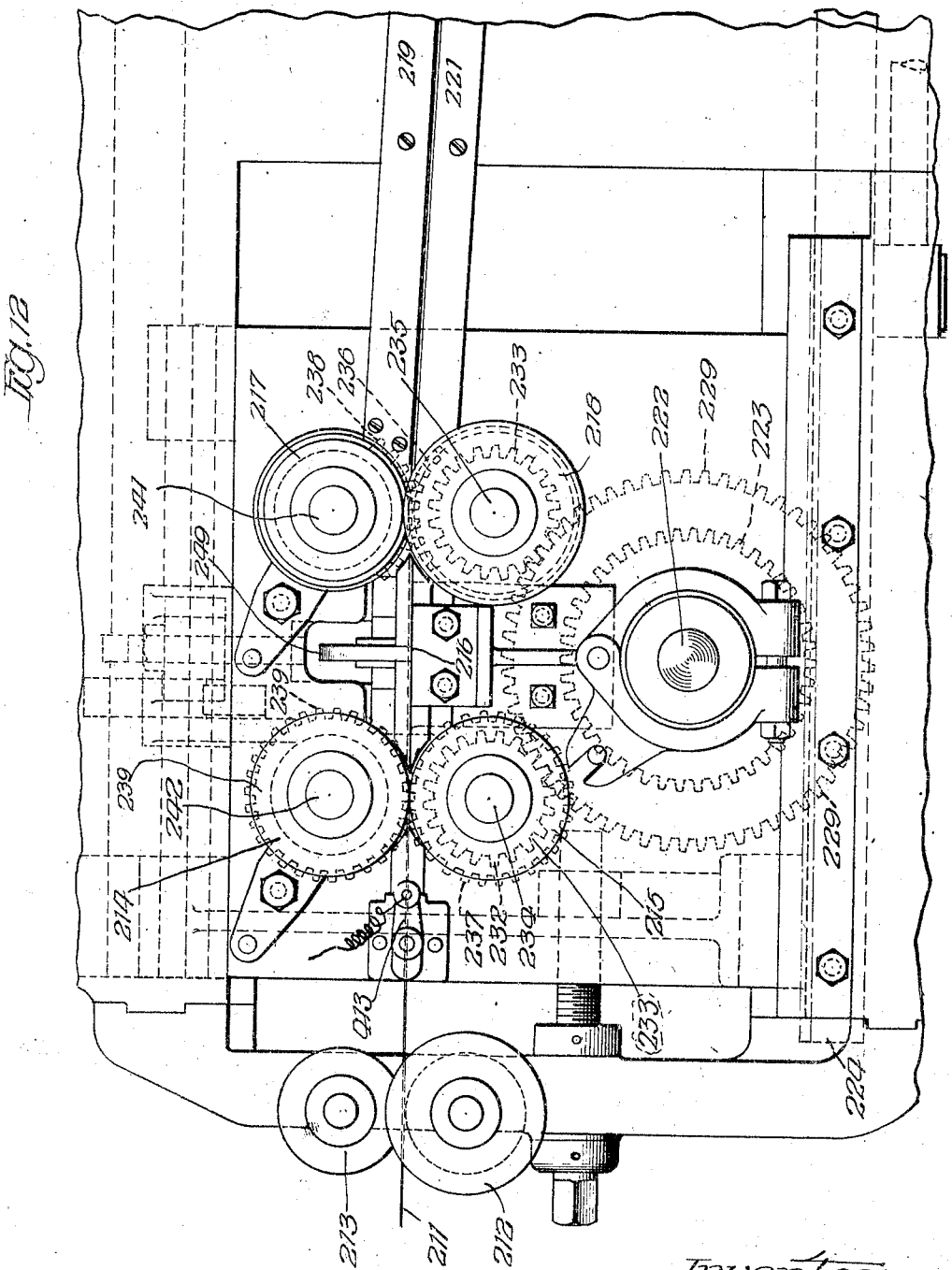

July 14, 1925.
M. E. WIDELL ET AL
1,545,624
CAN HEADING AND SEAMING MECHANISM
Filed Jan. 18, 1922    17 Sheets-Sheet 11
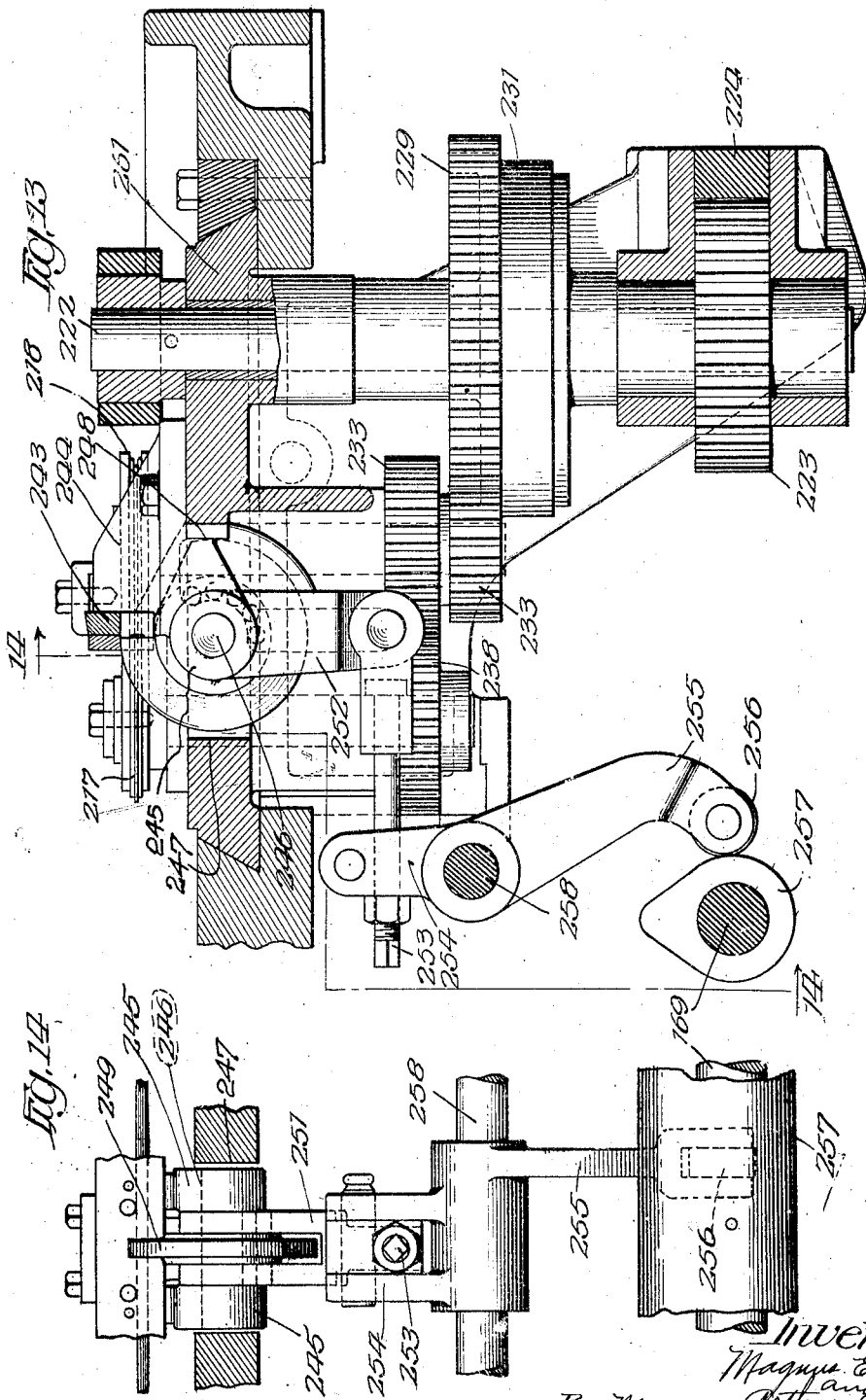

July 14, 1925.
M. E. WIDELL ET AL
1,545,624
CAN HEADING AND SEAMING MECHANISM
Filed Jan. 18, 1922     17 Sheets-Sheet 12
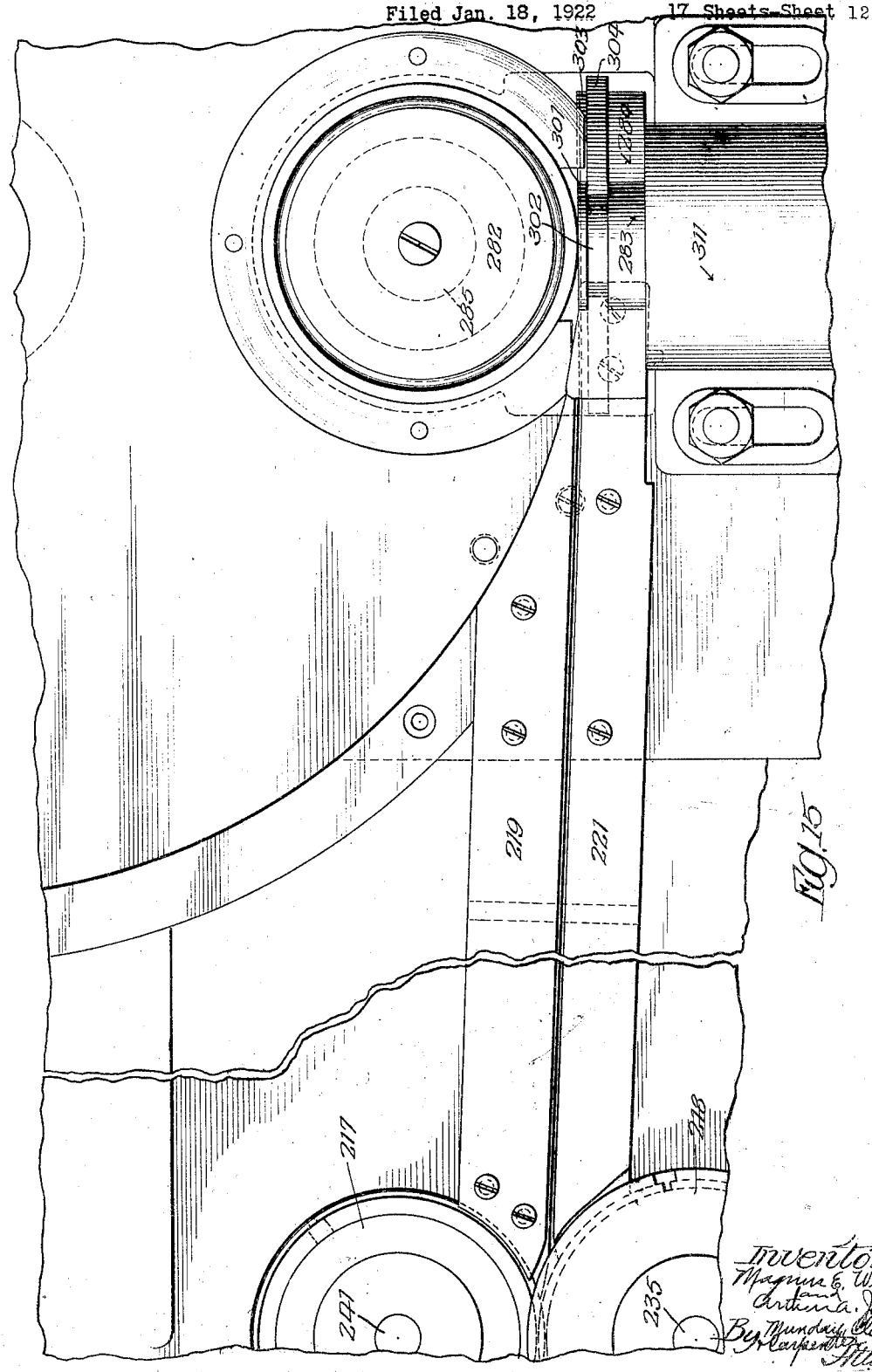

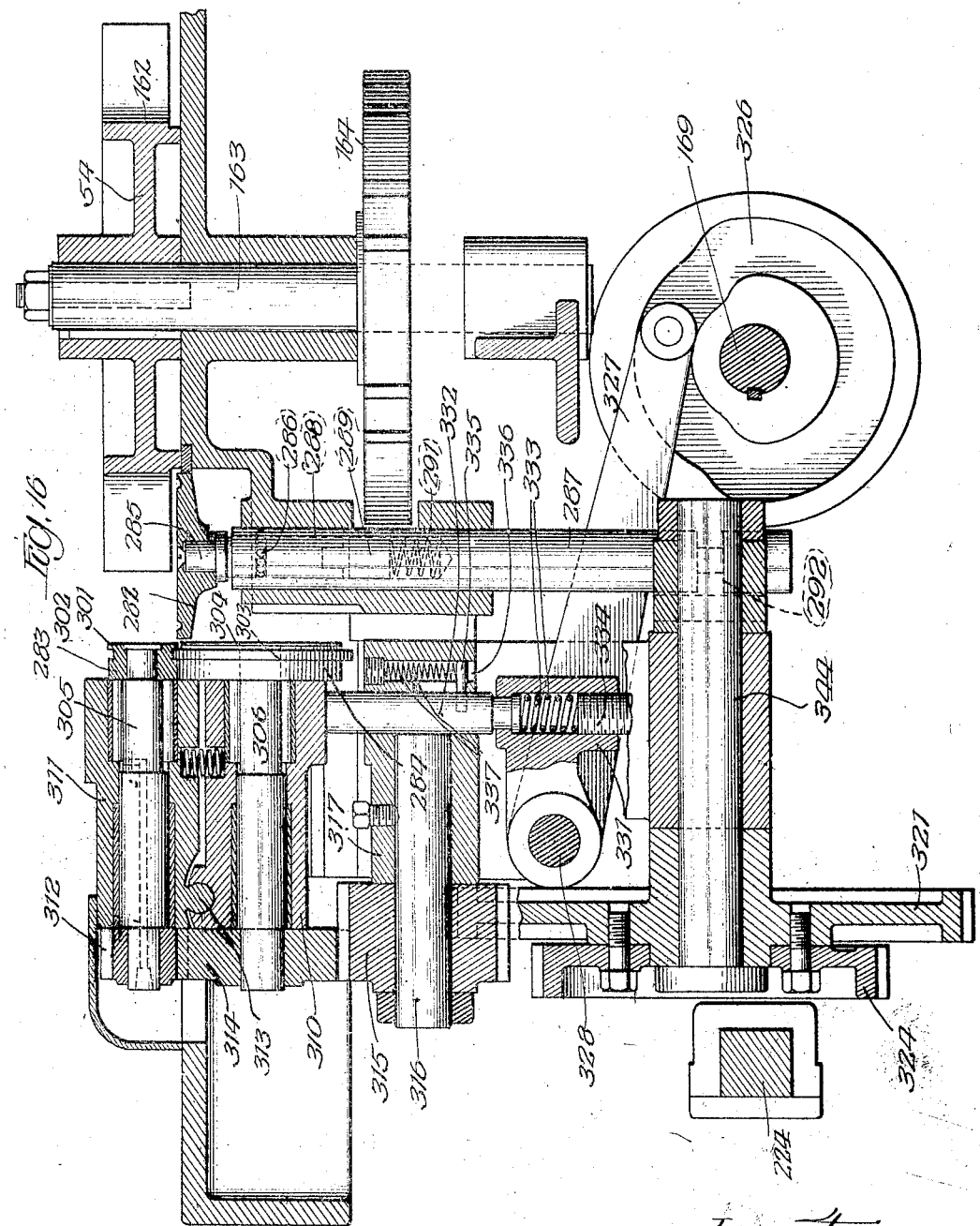

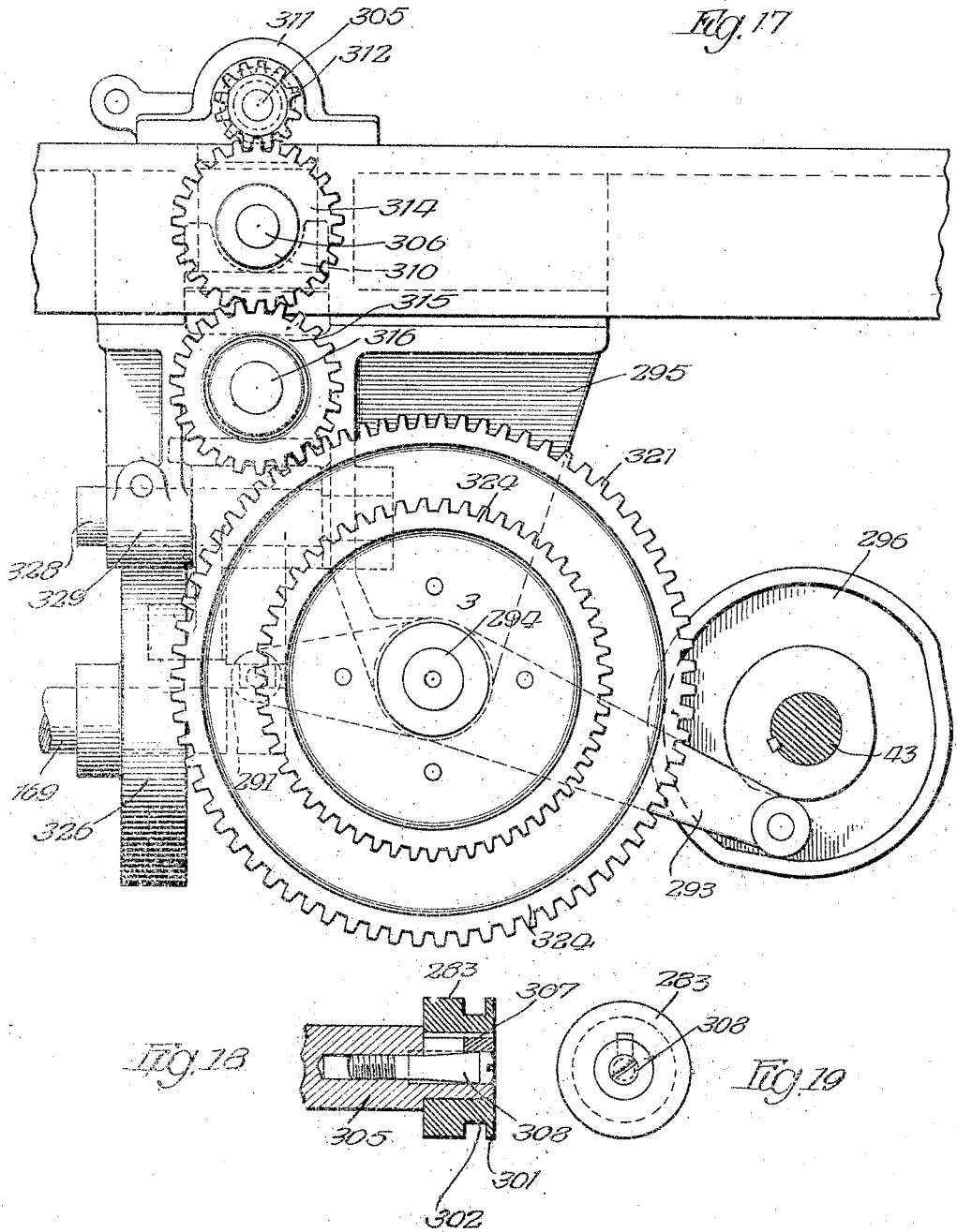

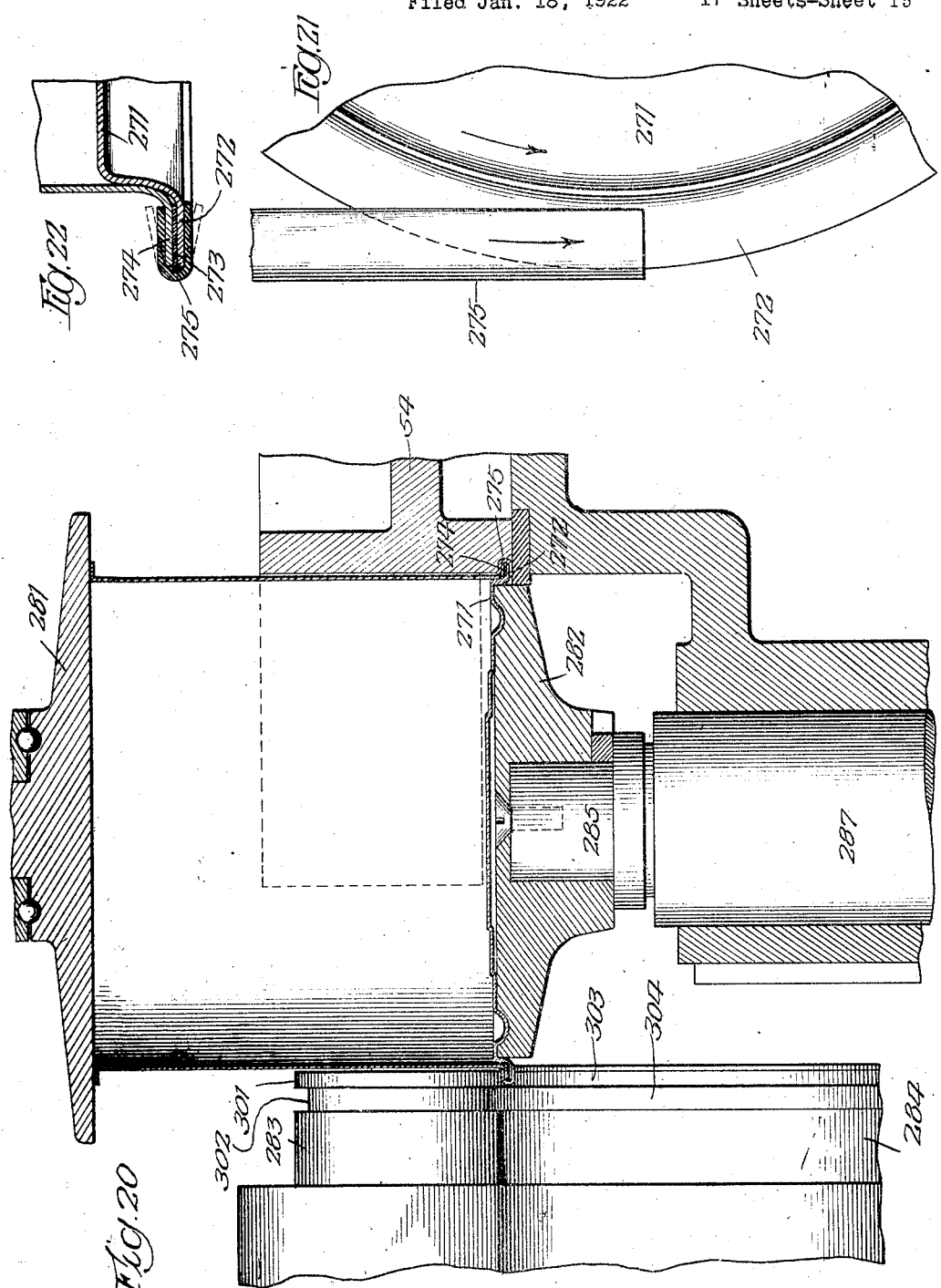

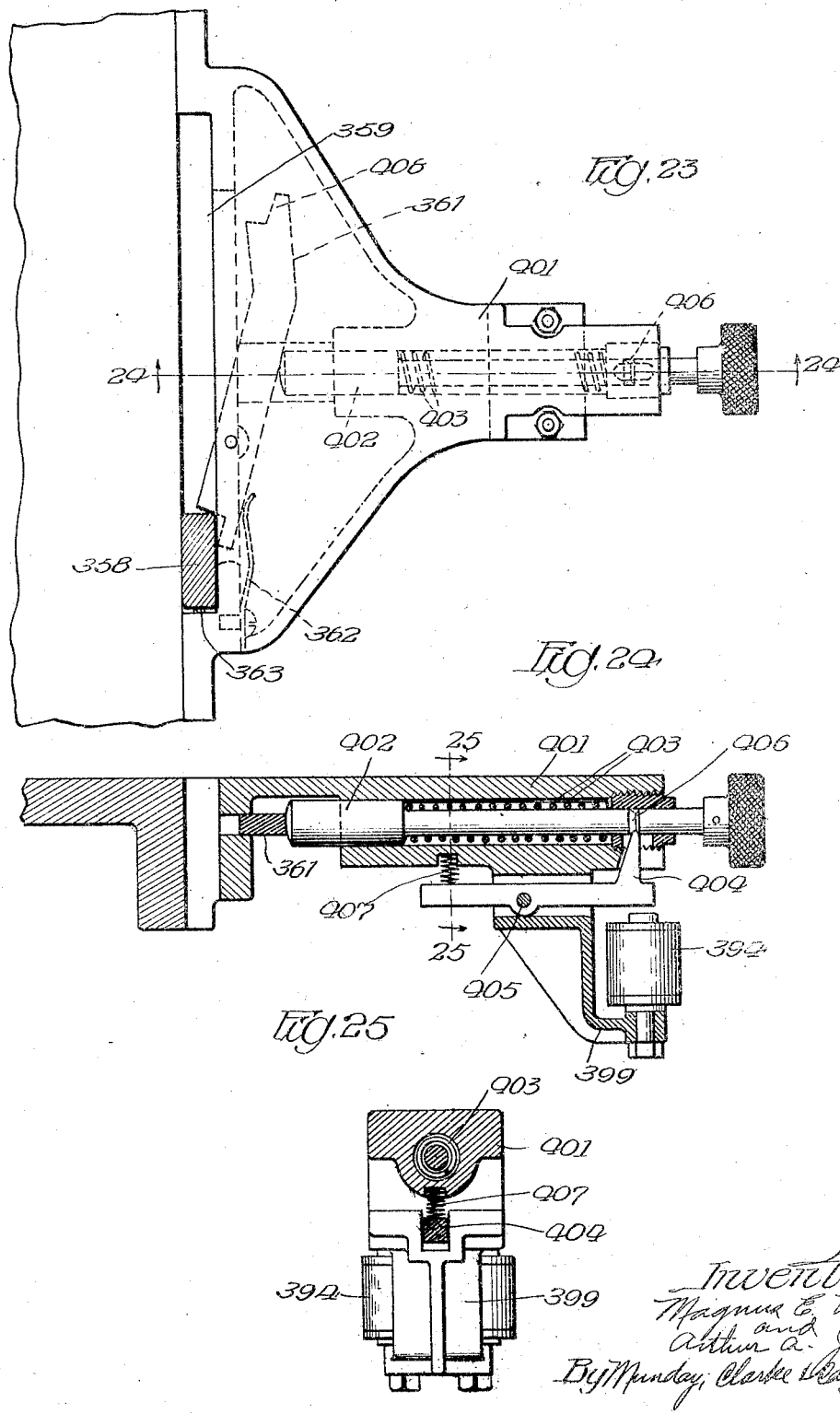

July 14, 1925. 1,545,624
M. E. WIDELL ET AL
CAN HEADING AND SEAMING MECHANISM
Filed Jan. 18, 1922 17 Sheets-Sheet 17

Patented July 14, 1925.

1,545,624

UNITED STATES PATENT OFFICE.

MAGNUS E. WIDELL, OF CINCINNATI, OHIO, AND ARTHUR A. JAHR, OF FOREST PARK, ILLINOIS, ASSIGNORS TO AMERICAN CAN COMPANY, OF NEW YORK, N. Y., A CORPORATION OF NEW JERSEY.

CAN HEADING AND SEAMING MECHANISM.

Application filed January 18, 1922. Serial No. 530,088.

*To all whom it may concern:*

Be it known that MAGNUS E. WIDELL, of Cincinnati, and ARTHUR A. JAHR, of Forest Park, citizens of the United States, in the counties of Hamilton and Cook, respectively, and States of Ohio and Illinois, respectively, have invented a new and useful Improvement in Can Heading and Seaming Mechanism, of which the following is a specification.

This invention relates in general to can heading and seaming mechanism and while the embodiment of the invention shown on the drawing and selected for the purposes of illustration is particularly adapted to the heading or seaming of a can by enclosing outwardly extending flanges on the cover and body within a strip of metal, it will be manifest that numerous features of the invention are capable of valuable use in heading and closing machines of other type, as for example double seamers and the like.

A principal object of the present invention is the provision of a fully organized automatic and highly efficient apparatus for seaming cans of the character described.

Another important object of the invention is the provision of a complete detector control adapted to either stop the machine upon exhaustion of any of the component parts entering into the can seam or to insure its idle running in the absence of such parts. The present apparatus is adapted in this respect to cause the machine to stop entirely if the supply of strip material is not maintained and if the bodies are not present for operation. It contemplates also the idle running of the machine if the can ends are not properly lined, i. e. should the gasket feed fail on one or more particular strokes.

Another object of the invention is the provision of a machine or apparatus, which, with few simple changes, will be adapted to operate on cans of different diameters and which may be adjusted accurately for work on a can of particular diameter.

Numerous other objects and advantages of the invention will be apparent as it is better understood from the following description, which, taken in connection with the accompanying drawings, discloses a preferred embodiment thereof.

Referring to the drawings,

Figure 1 is a front elevation of a machine embodying our invention;

Fig. 2 is an end view thereof;

Fig. 3 is a section taken substantially on the line 3—3 of Fig. 2;

Fig. 4 is an end view looking from the opposite end of the machine;

Fig. 5 is a plan view of the body and lower operative parts, the right frame parts and power shaft being shown in section;

Fig. 6 is an enlarged detail plan view of the body feeding turret and like parts;

Fig. 7 is an enlarged plan view of a liner feeding mechanism;

Fig. 8 is a section taken substantially on the line 8—8 of Fig. 7;

Fig. 9 is an enlarged plan view of the end feed;

Fig. 10 is a side elevation thereof;

Fig. 11 is a detail section through the end feed;

Fig. 12 is a top plan view of the strip feed and forming mechanism;

Fig. 13 is a section through the cut-off mechanism;

Fig. 14 is a section taken substantially on the line 14—14 of Fig. 13;

Fig. 15 is a top plan view of a strip feed and seaming roll;

Fig. 16 is a section through the seaming rolls and attendant parts;

Fig. 17 is an end view looking toward the right in Fig. 16;

Fig. 18 is a section of the upper roll showing its mounting;

Fig. 19 is an end view thereof;

Fig. 20 is a view partially in elevation and partially in section showing the actual seaming operation;

Fig. 21 is a schematic view showing the starting of said operation;

Fig. 22 is a section through a finished seam;

Fig. 23 is a top plan view of the main starting lever control;

Fig. 24 is a section taken substantially on the line 24—24 of Fig. 23;

Fig. 25 is a section taken substantially on the line 25—25 of Fig. 24; and

Figure 26:
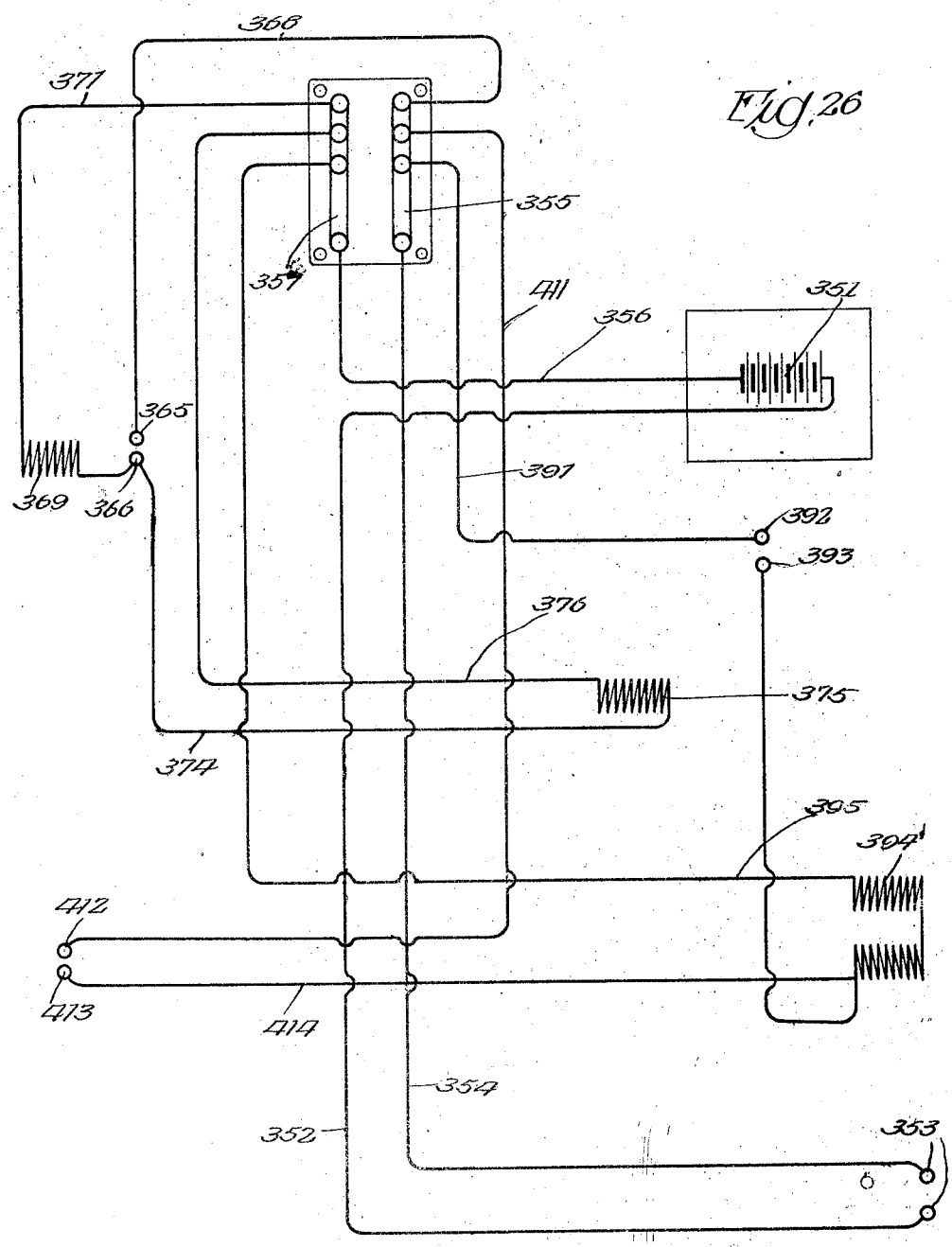
Fig. 26 is a diagrammatic view of the wiring employed.

Referring now to Fig. 1 reference character 31 indicates the frame of the apparatus which may, of course, be of any usual or suitable construction and having a bed or table 32 at the top. In the present instance an electric motor 33 is provided to drive a power shaft 34 through pulleys 35 and belt 36. The shaft 34, which is mounted in bearings 37 and 38 on the frame, is clutch-connected with the pulley by a clutch mechanism 39, which is adapted to be thrown in or out to start or stop the machine as occasion may require, detail description of this clutch is not believed necessary to an understanding of this invention.

The shaft 34 carries a pinion 41 meshing with a gear 42 on a cross-shaft 43 having bearings at 44—44 in the frame. This shaft 34, through various driving connections which will be hereinafter explained, drives and coordinates the several interrelated moving parts of this apparatus. The present apparatus is intended to feed disks of gasket material singly from the stack and into an intermittently moving turret. Each disk thus fed into the turret is next carried to a gasket cutting station at which a core is removed from the disk leaving the finished gasket within an opening in the turret. The next step or intermittent advance positions this gasket at a detecting station and the next positions it at a can end feed station. Here a can end is taken from the stack and positioned in the same opening beneath the gasket. The next intermittent advance step carries the can end and gasket to an assembling station. At this station the can end is moved under a guide for the can bodies. These bodies have been fed into pockets in a turret moving above the gasket-carrying turret, the can body turret also having an intermittent motion. The parts come to rest with the can body, gasket and end in vertical alinement and the plunger ascending assembles the three parts coacting in this action with an assembling head which engages the top of the can body. At this time a truing arm is swung in to true the can body for the reception of the end. Thereafter the body turret carries the assembled structure around to a seaming station. Means are provided adjacent this station for automatically feeding and channeling a sealing strip. In the present instance this sealing strip comes from a continuous reel, being intermittently advanced, cut off and formed channel shape. The forward end of each strip piece thus channeled is positioned about the flanges of the body and can end and two rolls at the assembling station roll it tightly into place forming the seam. Detecting apparatus, as already suggested, is provided for insuring the presence of the body and gasket and strip to enter into the seam.

Fig. 5 may be taken to be a plan view of the turrets above-mentioned and on this view reference character 51 indicates the stack from which the paper disks are fed, reference character 52 the turret receiving them, reference character 53 a stack of can ends, reference character 54 the body turret, reference character 55 the strip feeding and forming mechanism, and reference character 56 the seaming mechanism.

Referring now to Figs. 7 and 8 the paper disk feed will be described. A table extension or bracket 61 supports a slide housing 62 for a feed slide 63 which selects the bottommost disk periodically from the gasket stack 51. This stack is held in place between posts 64 extending up from an opening 65 through the slide support 62, this stack being supported at the front end on shelf 66 and at the back end by slide guides 66'. The slide 63 is provided with an inclined end 67 from which a tooth 68 extends up. The shelf 66 is arranged adjacent to and just beneath two guide grooves 69 in plates 71 extending over the turret, the guide grooves 69 being provided with down-curved entrance lips 70. A lever 72 connects by an arm 73 with the slide and as will be presently explained causes the slide to reciprocate in unison with the intermittent advance of the turret 52. At each reciprocation the turret is stationary and the projection or lip 68 engages beneath the lowermost disk edge and pushes it forward through the guide 69, which, it will be noted, is inclined downwardly and into an opening 74 in the turret.

Referring to Fig. 3 it will be noted that the lever 72 has bearing at 75 in a bracket arm 76 extending out from the machine frame 31. The lower end of this lever is connected by a rod 77 with a can end feeding lever 78 pivoted at 79 on a bracket 81 at the opposite side of the frame. The lever 78 enters a cam 82, which in its rotation produces the desired and periodic reciprocation of the lever 78 of the can end feed and of the disk through rod 77 and lever 72. Cam 82 is on a shaft 83 having bearings at 84—84 in the frame and carrying at its opposite end a bevel gear 85 meshing with a bevel gear 86 upon the lower end of a power shaft 87 which, by a bevel gear 88, receives its power from a bevel gear 89 on power shaft 43.

The turret 52 is caused to rotate with an intermittent motion by a driving connection which will now be described. This turret is mounted on the upper end of a shaft 91 which extends down into a bearing 92 at the bottom having upper bearing at 93 in the table 32. The shaft 91 carries a gear 94 having angle teeth, some of which are cut away, as indicated at 95. This gear 94 is engaged by a gear 96 on shaft 83, said gear 96 having a number of angle teeth and a tooth extending circumferentially. The angle teeth of the gear 96 when engaged by the angle teeth of the gear 94 cause rotation of the turret, this rotation occurring during and only during the rotation of said angle teeth. Immediately thereafter the straight tooth 90 enters between the cutaway and sharpened parts of the teeth at 95 and holds the turret stationary until the next desired advancing intermittent step, this being a well known gearing for the intermittent transmission of rotary movement. In the present construction the turret 52 is provided with six openings 74 and each advancing step is one-sixth of a revolution. At the end of the first advance the paper disk within the opening 74 is brought between gasket cutting dies 97 and 98 of usual construction. The upper die 97 is mounted in a cross-head 99 carried in guides 101 in a head structure mounted upon side uprights 102 and 103 of the frame. The shaft 87 has an upper bearing in a bracket 104 of upright 101 and carries a bevel pinion 105 at its upper end. This pinion meshes with a bevel pinion 106 upon a crank shaft 107 connected by arm 108 with the head 99 to cause reciprocation of the die 97. The lower die 98 is carried in a head 109 mounted between guides 111 and 112 in the lower part of the frame. This head is reciprocated by an eccentric pitman 113 embracing an eccentric on shaft 83. The die 98 is hollow and receives the core piece. The next advancing intermittent movement of the turret 52 carries the gasket formed by the dies to a detecting station to be later described in this specification. During this movement of the gasket it is riding upon a ledge 115 (Fig. 8). The next advance of the turret 52 positions the gasket at the can end receiving station, i. e. opposite the stack 53, and the can end fed in beneath it through an opening 116 cut in the underside of the turret 52. Details of the can end feed are perhaps best shown in Figs. 9 to 11.

A circular ring member 117 is positioned on the table 32 and from this the posts 118 forming the stack holder extend upwardly. The ring 117 is provided with two lugs 119 at its rear edge and in these is pivotally mounted a cross shaft 121. Two can end separator pawls 122 are provided, each said pawl being mounted upon a cross-shaft 123 at each side of the stack and each pawl has an inwardly extending lip 124. The height of these pawls is such that these lips 124 normally extend in and engage above the flange of the lowermost can end. A spring 125 is provided to move the end or lip 124 normally from stack engaging position. Arms 126 are fastened on the ends of the shaft 121 and extend over the tails 127 of the stack engaging members 122. The can ends are taken from the stack by a slide 128 moved by a link 129 connected to lever 78, already mentioned. This slide carries an end advancing member or lip 131 at its forward end and is provided with a cam 132 which engages beneath a roll 133 in a central arm 134 fast on the shaft 121. At each advance of the slide the engagement of the roll 133 with the cam 132 oscillates the shaft 121 and lifts the lips 124 by depressing the tails 127 of stack separators 122. Springs 135 each secured at one end at 136 from appropriate posts 118 and at the other to the arm 126 cause the roll 133 to follow the upper surface of the slide in the slide movement. A stack separating slide 137 is provided at each side of the stack and this slide is secured to an end 138 of a lever 139 pivoted at 141 and carrying a roll 142 for engagement with the side of the slide. A spring 143 connects the free ends of the levers 139. The sides of the slide are provided with cam surfaces 144 so that the separating slides 137 are thrust in to lift and support the stack above the lowermost end in order that it may be projected by the forward end 131 of the feed slide.

Two dogs 145 are pivoted at 146 on the table and are normally arranged with their ends in registration with the opening through the stack holder. A spring 147 engaging pins 148 of the dogs tends to hold them against the can ends in the stack. These pins extend through apertures 149 to yieldingly engage the front side of the stack when the lowermost is withdrawn.

The next advance of the turret 52 brings the end and gasket to the assembly station, the end moving beneath the gasket in the lower pocket of the turret and the gasket riding on its ledge.

The delivery of the can bodies to this same assembling station will now be described. The can bodies to be seamed are fed along between guideways 151—152 on a table extension 153—Figs. 1, 2, 5 and 6. Two conveyer chains 154 movable with the bottom of this table in slots 155 are provided. These chains take over sprockets 156 and 157 in the frame and over driving sprockets 158' on a shaft 160, in turn having a sprocket 158 driven by a sprocket chain 159 from a sprocket wheel 161 on shaft 43. Referring now to Fig. 6, it will be noted that the guides 151 and 152 direct the can bodies into pockets 162 of turret 54. This turret is mounted upon the upper end of a shaft 163 which is advanced intermittently by a Geneva movement 164 and 165 (Fig. 5), the reference character 164 indicating the star wheel and the reference character 165 indicating the arm gear. The arm gear 165 is mounted on a shaft 166 carrying a bevel gear 167 in mesh with a bevel gear or pinion 168 on a shaft 169 in turn having a bevel gear 171 meshing with a bevel gear 172 on shaft 43. The turret 54 brings the can end into vertical alinement with the gasket and can body at this station. At this station an arm 181 is fast on the upper end of a shaft 182 and is provided with a jaw 183 adapted to mate with the pocket 162 of the turret to round up the can body. The shaft 182 upon which this jaw is mounted carries at its lower end an arm 184 (Fig. 4) which is engaged by a cam 185 on the end of shaft 169, the construction and arrangement of the parts being such that this jaw is swung inwardly at appropriate intervals.

Immediately after the swinging in of the jaw and while the body is still held in alined position a head descends on the top of the can and a plunger comes up from beneath forcing the can end through the opening in the can body and gasket turret and carrying the end first against the gasket and then lifting the gasket and end against the flange of the can body.

It will be noted that the shaft 83 (Fig. 4) is provided with a cam 191 in which is engaged a roll 192 on the end of a lever 193. This lever, which is pivoted at 194 in the frame, is connected by a link or pitman 195 with a plunger 196. A head extension 197 is provided upon the cross-head 99 so that this head extension moves down with the cross-head. On its underside it carries a plate 198 sustained by a screw 199 at one end and a slide rod 201 at the other. Locks 202 are provided to hold the plate 198 in adjusted position. The purpose of this plate is to adapt the apparatus to operation upon can bodies of different heights.

The can having been assembled with its end is now carried to a seaming station, the flanges of the body and end are engaged by the forward end of a feeding strip preparatory to seaming the parts together. The apparatus for feeding in and forming this feeding strip will now be described. Referring to Fig. 12, reference character 211 indicates a source of seaming strip supply which may be taken to come from a continuous roll. The strip first passes through a pair of guide rolls 212 and 213, which in the present instance are idle rolls. It then passes through two positively driven feed rolls 214 and 215, next past a cutting mechanism at 216 and then by two channelling or forming rolls 217 and 218 and thus through guides 219 and 221 to the seaming station. The rolls 214 and 215, and 217 and 218 are positively driven. A shaft 222 (Fig. 13) is mounted in the machine and carries a pinion 223 in engagement with a rack 224 (Fig. 1) mounted in guides 225 and 226. This rack is engaged by a connecting rod or link 227 with a crank 228 on shaft 43. The shaft 222 drives a gear 229 through a one-way motion device 231 of any well-known or preferred construction. That is to say, the rack, by reason of the one-way motion device 231, has an idle stroke or reciprocation. The gear 229 is in mesh with pinions 232 and 233 respectively fast on the shafts 234 and 235 of rolls 215 and 218. These shafts also carry gears 236 and 237 in mesh with gears 238 and 239 on shafts 241 and 242 carrying the rolls 217 and 214 respectively. The cutting mechanism is indicated in Figs. 13 and 14. The cutter comprises a fixed die 243 mounted in a support 244 alongside the travel of the strip. From this support two bearing lugs 245—245 extend down and receive a shaft 246, these lugs being positioned in a slot 247 in the bed and having bearings against stops 248 at the back. An active cutter 249 is fixed on the shaft 246. This shaft is also engaged by a bifurcated end 251 of a link 252 which is connected by a second link 253 with the tail 254 of a cam lever 255. This cam lever carries a roll 256 engaging a cam 257 on shaft 169. The lever 255 is pivoted upon a cross-shaft 258 mounted in the frame. The entire strip feeding roll mechanism, including the roll drive and cutter is mounted in a slide 261 adapted to be moved lengthwise of the table to provide the cutting and feeding of strips of different length. To this end the cam 257 is made long as may be seen in Fig. 14 so that it will not have to be moved in this adjustment.

The mechanism for seaming the can will now be described. In Figs. 20 to 22 the form of seam produced is disclosed. In these figures reference character 271 indicates the can end proper and reference character 272 its flange. The gasket is shown at 273 and the flange of the body at 274. A sealing strip 275 of U shape form embraces these parts in tight engagement. Fig. 21 shows the initial engagement of the strip and superimposed flanges.

In the seaming action a head or chuck 281 engages the upper end of the body and forces it down against a rotatable can support 282. The head 281 is carried at the outer end of the cross-head extension 197 (see Fig. 4) and descends with the cross-head. An upper fixed roll 283 engages on the top of the seam and a lower and upwardly moving roll 284 on the bottom. These rolls are positively driven and rotate and squeeze the seam together in the seaming action.

Referring now to Figs. 16 and 17 it will be noted that the support 282 is mounted on a stem 285 engaging thrust bearing 286 in the end of a post 287. The thrust bearing is supported within this post by a plug 288 in turn resting upon a plug 289 held up by a spring 291. The post 287 is adapted to be lifted somewhat itself in the clamping action and to this end is provided at its lower end at 292 for engagement by a lift lever 293 pivoted on a shaft 294 having bearings in a downwardly extending bracket 295. The lever 293 engages a cam 296 on shaft 43 and slight upward movement is thus imparted to the lift at each can seaming operation. The roll mounting and construction is perhaps best seen in Figs. 16, 18 and 19, from which it will be noted that the upper roll 283 is provided with an active roll part 301 and with a recess 302. The lower roll 284 is larger and is provided with an active part 303 and an outstanding annular flange or projection 304 engaging in the recess 302 of the upper roll. Each roll is fast on the end of a shaft 305 and 306 respectively. A spline 307 prevents independent rotation of the roll and a lock screw 308 holds it in position. The roll 283 is mounted in a fixed bearing 311, the shaft 205 extending through this bearing and carrying a gear or pinion 312 at its rear end. The bearing 310 for the shaft 306 of the roll 284 is connected with the bearing 311 by a pivoted joint 313 so that this shaft may swing slightly in its action, the purpose of this being to permit approach and retraction between the rolls. The shaft 306 carries a gear 314 at its rear end, which gear is in mesh with a pinion 315 on a shaft 316 mounted in a bearing 317. The pinion 315 is engaged by a gear 321 on the shaft 294. A second gear 324 is fixed on the outer face of gear 321 and this gear is adapted for actuation by a pinion 325 (Fig. 1). The rolls are thus rotated continuously and up and down movement of them to clamp the can flanges in the seaming operation is accomplished from the cam 326 mounted on shaft 169. This shaft engages an arm 327 on a stub shaft 328 having bearing at 329 in the frame and carrying a head 331. This shaft engages the lower end of a slidable plug 332 moving through the bearing 317 and engaging at its under end the forward or free end of the bearing 310 for the roll shaft 306. A spring 333 is interposed between the lower end of this post 332 and a plug 334 in the head so that the lift is through the spring. A pin 335 moves in a slot 336 and against a spring 337 for causing positive return of the plug.

After the seaming operation is completed the cans are moved on out into a guideway formed by guides 341 and 342 for discharge from the machine.

Fig. 26 is a wiring diagram showing the circuits which cause the machine to stop or run idly upon failure of supply of the parts entering into the seam. On this figure reference character 351 indicates a suitable source of electric current, one side of which is connected by wire 352, contacts 353 and wire 354 with a contact bar 355, the other terminal of the source 351 of electric current is connected by wire 356 with a second contact bar or set of terminals 357. The terminals or bars 355 and 357 will throughout the rest of this discussion be taken to be the source terminals and the circuits will be traced to and from them.

Terminals 353 are provided merely as a battery cutout, it being understood that these terminals are opened when the machine is stopped, and remain open while the machine is idle. Reference character 358 indicates a lever for moving the clutch 39 into and out of operation and this clutch is provided with spring parts to normally throw the lever to clutch released position. The lever moves in a slot 359 and a pivoted dog 361 actuated by a spring 362 locks the lever in operative position. The contacts are located at the point 363 (Fig. 23) and may of any usual or preferred construction.

It is intended that should the supply of paper disks fail or no gasket be present in the turret 52 at the idle station between the cutting of the gasket and the feeding of the end, no end will feed from the stack of can ends. Referring now to Fig. 5 it will be noted that a contact member 364 is arranged upon and insulated from a rod 365 depending from the cross-head and carries a pin 366 extending down into the opening of the turret in condition to engage the upper face of a gasket. Therebelow is mounted a second contact 367 which is moved up with the lower gasket cutting die. If there is a gasket present the gasket holds the contacts separated and if not they complete an electric circuit, which, as will be presently described, energizes a magnet and prevents feeding of a can end under this particular aperture in the turret. This circuit comprises wiring 368 leading to contact 365, contact 366, magnet or relay 369 and wire 371 back to battery. The magnet relay 369 is shown in Fig. 5 and its armature controls the action of an arm 372. This arm drops down between two lugs 373 mounted upon the levers 139 preventing them from being drawn inwardly on return of the cam slide 128. This causes the lift slides 137 to remain in lifting position and hold the stack of can ends up so that the lowermost can end does not drop down in position for feeding. At the same time feeding of a can body is prevented through a circuit as follows: Wire 368, contacts 365 and 366, wire 374 to body control relay 375, wire 376 back to battery.

An arm 377 (Figs. 5 and 6) is mounted loose on an oscillating shaft 378 and extends across the exit of the passageway through guides 151 and 152. Under the normal operation of the machine the cans may push this arm out of the way and enter the pockets of turret 54 as they are advanced by the conveyor chains hereinbefore described. The shaft 378 is actuated from a cam 379 on shaft 169. A second arm 381 is fixed on this shaft and oscillates with it.

This arm carries a bell crank pivoted at 382, one arm of which is a pawl 383 and the other 384 extends over the center of oscillation of the shaft. The arm 377 carries a lug 385 adapted for engagement by the pawl when the bell crank is moved slightly in a clockwise direction (viewing Fig. 6) and when thus engaged the arm is swung over to prevent the entrance of the can body into the pocket. This movement is accomplished by a rod 386 carrying an armature 387 of magnet 375. The failure of a gasket therefore causes failure of both an end and body to feed. The interruption of the operation of the machine is purely temporary since due to the flimsy character of the gasket material it might well occur that the feed might merely skip a pocket in the turret 52 and thereafter continue the feeding accurately. When, however, the strip feed fails or the body feed fails it is desired to entirely stop the machine.

Considering next the body feed, current flows from contact bar 355 through wire 391 through body terminals 392 and 393 to magnet 394 and from magnet 394 by wire 395 to contact bar 357. A leaf 396 is pivoted at 397 beneath the guide 152 and extends into the path of can body travel as may be observed from Fig. 5. The two contacts 392 and 393 are located respectively on the leaf and on a bolt bracket 398. When this circuit is completed the energization of the magnet 394 releases the clutch lever. Referring to Figs. 23 to 25 it will be noted that the magnet or relay 394 is mounted in a bracket 399 below an extension 401 carrying the latch 361. In this extension is mounted a plunger 402 normally pushed by a spring 403 toward latch 361 as may be seen in Fig. 23. It is restrained against this movement by a tooth lever 404 pivoted at 405 in the bracket 399, the tooth engaging in a recess 406 of the plunger being held in this position by a spring 407. When the magnet is energized the tooth is drawn downwardly and the spring 403 is released. This spring is greater in strength than the spring 262 and the lever 363 will move to the opposite end of the slot 359 and be caught in this position against any rebound and until the machine is again started by the other end 408 of the latch 361 resulting in the throw-out of the clutch and the stopping of the entire apparatus.

A circuit is provided for also stopping the apparatus upon failure of the strip feed; this circuit comprising wire 411 to strip contacts 412 and 413, wire 414 to relay 394 and wire 395 back to battery. The two contacts 412 and 413 are suitably located upon opposite sides of the strip, as may be seen in Fig. 5, and upon the contacts engaging each other energize the magnet relay 394 and stop the machine as above described. The said contacts have insulating portions which are forced apart by the passing strip when it is being properly fed, and which can move towards each other and permit the contacts to engage and complete an electric circuit when the strip is absent.

It will be manifest that all of these circuits mentioned may be completed in part through the machine by grounding, the diagram merely indicating the several circuits.

The apparatus shown on the drawing may be readily adjusted to cans of different heights and different diameters by few simple changes, as for example the substitution of different turrets of proper dimension, the movement of the various guides as indicated on the drawings, and the substitution of proper stack holders, end and disk feeds.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In an apparatus for seaming a flanged can end to a flanged can body by enclosing the same in a sealing strip, the combination of means for assembling the end and body, devices for feeding a seaming strip, and means for stopping the machine upon failure of proper feeding of the seaming strip.

2. In an apparatus for seaming a flanged can end to a flanged can body by enclosing the same in a sealing strip, the combination of means for assembling the end and body, devices for feeding a seaming strip, and means for stopping the machine upon the absence of a can body.

3. In an apparatus for seaming a flanged can end to a flanged can body by enclosing the same in a sealing strip, the combination of means for feeding a can body and can end, means for feeding a sealing strip, and means for interrupting the strip feeding upon improper feeding of said can body.

4. In an apparatus for seaming a flanged can end to a flanged can body by enclosing the same in a sealing strip, the combination of means for feeding a can body and can end, means for feeding a sealing strip, and means for interrupting the body feed upon interrupted feeding of said strip.

5. In an apparatus for seaming a flanged can body to a flanged can end by enclosing said flanges in a sealing strip, the combination of, means for feeding a gasket, means for feeding an end, means for feeding a body, means for feeding a sealing strip, and means for interrupting the feeding strip action upon the absence of a body.

6. In an apparatus for seaming a flanged can end to a flanged can body by enclosing said flanges in a sealing strip, the combination of, means for feeding a gasket, means for feeding an end, means for feeding a body, means for feeding a sealing strip, and means for interrupting the end feed action upon the absence of a gasket.

7. In an apparatus for seaming a flanged can end to a flanged can body by enclosing said flanges in a sealing strip, the combination of, means for feeding a gasket, means for feeding an end, means for feeding a body, means for feeding a sealing strip, and means for interrupting the feeding of the can end and body upon the absence of a gasket.

8. In an apparatus for seaming a flanged can end to a flanged can body by enclosing said flanges in a sealing strip, the combination of, means for feeding a gasket, means for feeding an end, means for feeding a body, means for feeding a sealing strip, and means for interrupting the action of the body feed upon the absence of a strip.

9. In an apparatus for seaming a flanged can end to a flanged can body by enclosing said flanges in a sealing strip, the combination of, means for feeding a gasket, means for feeding an end, means for feeding a body, means for feeding a sealing strip, and means for interrupting the body and end feeds upon the absence of a gasket.

10. In an apparatus for seaming a flanged can end to a flanged can body by enclosing said flanges in a sealing strip, the combination of, means for feeding a gasket, means for feeding an end, means for feeding a body, means for feeding a sealing strip, and means for interrupting the feeds of the end and body upon the absence of the gasket, and means for stopping the machine upon the absence of a body.

11. In an apparatus for seaming a flanged can end to a flanged can body by enclosing said flanges in a sealing strip, the combination of, means for feeding a gasket, means for feeding an end, means for feeding a body, means for feeding a sealing strip, means for interrupting the feeds of the end and body upon the absence of the gasket, and means for stopping the machine upon the absence of a strip.

12. In an apparatus for seaming a flanged can end to a flanged can body by enclosing said flanges in a sealing strip, the combination of, turrets adapted to feed respectively gaskets, ends and bodies to an assembling station, one of said turrets feeding said end and body from said station to a seaming station, and strip seaming rolls at said seaming station.

13. An apparatus for seaming flanged can ends to flanged can bodies, comprising roller instrumentalities for feeding and seaming the parts, power mechanism, said power mechanism including a starting and stopping manually operable member, and means locating said member in operative and inoperative positions.

14. In an apparatus for seaming can ends to can bodies, the combination of means for feeding the several parts entering into the seam, and a control mechanism for interrupting the feed of certain parts upon the temporary interruption of the feed of another part and for stopping the apparatus upon the failure of a supply of certain parts entering into the seam.

15. In an apparatus for seaming flanged can ends to flanged can bodies by encasing them within strip material, the combination of means for feeding the bodies and ends to an assembling station, means for feeding strip material thereon, said means being adjustable to provide strip of different length.

16. In an apparatus for seaming flanged can ends to flanged can bodies by the use of strip material, in combination means feeding bodies and ends to an assembling station, means feeding strip material to said assembling station and severing it from a continuous strip, said severing means being adjustable toward and away from said assembling station to vary the length of the strip.

17. In an apparatus for seaming flanged can ends to flanged can bodies by the use of strip material, in combination, means for feeding the ends and bodies to an assembling station, means for feeding strip material from a continuous source and forming it to engage said flanges, said feeding and forming means being adjustable toward and away from said assembling station to vary the length of strip material fed.

MAGNUS E. WIDELL.
ARTHUR A. JAHR.